United States Patent [19]

Brupbacher et al.

[11] Patent Number: 4,836,982

[45] Date of Patent: * Jun. 6, 1989

[54] RAPID SOLIDIFICATION OF METAL-SECOND PHASE COMPOSITES

[75] Inventors: John M. Brupbacher; Leontios Christodoulou, both of Baltimore; Dennis C. Nagle, Ellicott City, all of Md.

[73] Assignee: Martin Marietta Corporation, Bethesda, Md.

[*] Notice: The portion of the term of this patent subsequent to Dec. 1, 2004 has been disclaimed.

[21] Appl. No.: 873,889

[22] Filed: Jun. 13, 1986

Related U.S. Application Data

[63] Continuation-in-part of Ser. No. 662,928, Oct. 19, 1984, abandoned.

[51] Int. Cl.[4] ............................................. C22C 1/00
[52] U.S. Cl. .................................. 420/129; 420/590
[58] Field of Search ................... 420/590, 129; 75/129

[56] References Cited

U.S. PATENT DOCUMENTS

| | | | |
|---|---|---|---|
| 3,194,656 | 7/1965 | Vordahl | 75/135 |
| 3,726,643 | 4/1973 | Merzhanov et al. | 423/409 |
| 4,007,062 | 2/1977 | Sifferlen | 148/2 |
| 4,025,249 | 5/1977 | King | 425/6 |
| 4,161,512 | 7/1979 | Merzhanov et al. | 423/440 |
| 4,240,824 | 12/1980 | Moskowitz et al. | 75/0.5 |
| 4,268,564 | 5/1981 | Narasimhan et al. | 428/123 |
| 4,343,750 | 8/1982 | Holiday et al. | 264/8 |
| 4,402,745 | 9/1983 | Ray et al. | 75/251 |
| 4,431,448 | 2/1984 | Merzhanov et al. | 75/238 |
| 4,444,603 | 4/1984 | Yamatsuta et al. | 148/127 |
| 4,540,546 | 9/1985 | Giessen | 420/590 |

OTHER PUBLICATIONS

J. R. Pickens & E. A. Starke, Jr., "The Effect of Rapid Solidification on the Microstructures and Properties of Aluminum Powder Metallurgy Alloys," *Rapid Solidification Processing Principles & Technologies III*, Dec. 1982, pp. 150-170.

W. Cohen, B. H. Kear, R. Mehrabian, "Rapid Solidification Processing—An Outlook," pp. 1-22.

*Primary Examiner*—Christopher W. Brody
*Attorney, Agent, or Firm*—Herbert W. Mylius; Gay Chin

[57] ABSTRACT

This invention relates to a process for making in-situ precipitated second phase in a metal matrix which mixture is rapidly solidified to form a product. The invention also relates to a rapidly solidified product.

68 Claims, 3 Drawing Sheets

RAPID SOLIDIFICATION OF METAL-SECOND PHASE COMPOSITES

This is a Continuation-In-Part of application Ser. No. 662,928, filed Oct. 19, 1984 now abandoned.

FIELD OF THE INVENTION

The present invention relates generally to rapid solidification of certain metal-second phase composites and more particularly, the invention relates to preparation of a multi-phase alloy which is subjected to a rapid solidification technique to recover a dispersion of second phase particles in a macroscopically homogeneous matrix. The process for forming the metal-second phase composites used herein includes an in-situ precipitation of second phase material in a metallic matrix prior to rapid solidification, wherein the second phase comprises a ceramic such as boride, carbide, oxide, nitride, silicide, etc., of one or more metals, or an intermetallic such as an aluminide or silicide of one or more metals. The matrix metal also may constitute an alloy of two or more metals.

BACKGROUND OF THE INVENTION

For the past several years, extensive research has been devoted to the development of metal matrix composites, such as aluminum reinforced with carbon, boron, silicon carbide, silica, or alumina fibers, whiskers, or particles. Metal matrix composites with good high temperature yield strengths and creep resistance have been fabricated by the dispersion of very fine (less than 0.1 micron) oxide or carbide particles throughout the metal or alloy matrix. However, such composites typically suffer from poor ductility and fracture toughness.

Prior art techniques for the production of metal-second phase composites may be broadly categorized as powder metallurgical approaches, molten metal techniques and internal oxidation processes. The powder metallurgical-type production of such dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy techniques are then used to form the final composite. Conventionally, however, the ceramic component is large, that is, greater than 1 micron, due to a lack of availability, and high cost, of very small particle size materials, because their production is energy intensive, time consuming and costly in capital equipment. Furthermore, production of very small particles inevitably leads to contamination at the particle-to-metal interface which in turn comprises the mechanical properties of a resultant composite. Also, in many cases where the particulate materials are available in the desired size, they are extremely hazardous due to their pyrophoric nature.

Alternatively, molten metal infiltration of a continuous ceramic skeleton has been used to produce composites. In most cases, elaborate particle coating techniques have been developed to protect ceramic particles from molten metal during molten metal infiltration and to improve bonding between the metal and ceramic. Techniques such as this have resulted in the formation of silicon carbide-aluminum composites, frequently referred to as SiC/Al, or SiC aluminum. This approach is suitable for large particulate ceramics (for example, greater than 1 micron). The ceramic material, such as silicon carbide, is pressed to form a compact, and liquid metal is forced into the packed bed to fill the interstices. Such a technique is illustrated in U.S. Pat. No. 4,444,603 to Yamatsuta et al. Because this technique necessitates coating the ceramic particles, molten metal handling, and the use of high pressure equipment, molten metal infiltration has not been a practical process for making metal-second phase composites, particularly for making composites of submicron particles where press size and pressure needs would be excessive and unrealistic.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. Although this technique is limited to relatively few systems, because the two metals must have a wide difference in chemical reactivity, it has offered a possible method for dispersion hardening. However, the highest possible level of dispersoids formed in the resultant dispersion strengthened metal is generally insufficient to impart significant changes in properties such as modulus, hardness and the like.

The presence of oxygen in ball-milled powders used in prior art metallurgy techniques, or in molten metal infiltration, can result in a deleterious layer, coating, or contamination such as oxides at the interface of ceramic and metal. The existence of such layers will inhibit interfacial binding between the ceramic phase and the metal matrix, adversely effecting ductility of the composite. Such weakened interfacial contact may also result in reduced strength, loss of elongation and crack propagation.

Because conventional processes have difficulties, preparation of metal-second phase composites with second-phase dispersoids for commercial uses has not been extremely costly.

In recent years, numerous ceramics have been formed using a process termed "self-propagating high-temperature synthesis" (SHS). It involves an exothermic, self-sustaining reaction which propagates through a mixture of compressed powders. The SHS process involves mixing and compacting powders of the constituent elements and igniting a portion of a green compact with a suitable heat source. The source can be electrical impulse, laser, thermite, spark, etc. On ignition, sufficient heat is released to support a self-sustaining reaction, which permits use of sudden, low powder initiation of high temperatures, rather than bulk heating over long periods at lower temperatures. Exemplary of these techniques are the patents of Merzhanov et al, U.S. Pat. Nos. 3,726,643, 4,161,512, and 4,431,448, among others, hereby incorporated by reference.

Similarly, extensive research and development has been conducted in the area of rapid solidification (RS) processing. Rapid solidification processing effects highly desired forms of alloys. Homogeneous material at or above melt temperatures is subjected to a rapid quench or temperature drop to "freeze" the material to desired micro structure. The rate at which the melt is quenched is in the range of approximately $10^4°$ C. per second to $10^8°$ C. per second. See, for example, U.S. Pat. No. 4,402,745, hereby incorporated by reference.

Current technological interest in materials produced by RS processing, especially when used to produce fine powders followed by consolidation into bulk parts, may be traced, in part, to problems associated with the chemical segregation that occurs in complex, highly alloyed materials during conventional ingot casting and processing. During processing via slower cooling rates used for conventional casting processes, solute partitioning, that is, macro- and micro-segregation of different alloy phases present in these alloys, and the formation of undesirable, massive particle boundary eutectic phases, can occur. Metal powders produced directly from the melt by conventional powder production techniques, that is, drop tower, inert gas or water atomization of the melt, are usually cooled at rates three to four orders of magnitude lower than those that can be obtained by RS processing. The latter removes macro-segregation altogether and significantly reduces spacing over which micro-segregation occurs, if it occurs at all.

Design of alloys made by conventional slow cooling processes is primarily dictated by the corresponding equilibrium phase diagrams. Alloys prepared by such processes are in, or at least near, equilibrium. The advent of rapid quenching from a melt has enabled divergence from equilibrium and has added new alloys with unique structures and properties for commercial use.

Rapid quenching, or rapid solidification, techniques are known for manufacture of metal powder for powder metallurgical (PM) purposes by finely "atomizing" molten metal. Here, RS occurs not by contact but "inflight". This similarly permits little time for particle growth. The small drops produced solidify to form small granules, each one of which essentially constitutes an "ingot" of the molten metal. These small granules can be charged into a container that is evacuated and sealed. Afterwards, the small granules are compacted and concurrently or subsequently heated. This compaction and heating joins together the granules into a solid metal compact of the molten metal composition. This method is valuable for producing homogeneous materials from melt alloys which, if conventionally processed, would result in large-scale heterogeneities and segregation. Additionally, RS can produce materials containing fine metastable dispersoids and second phases.

Prior art techniques for "atomizing" molten metal have included impingement, melt spinning, and nozzle atomization.

In impingement techniques, atomization of molten metal into small drops is usually brought about in inert gas, such as argon or nitrogen. The gas impinges as high speed jets upon a pouring stream of molten metal. Water and steam have also been used. However, water and steam are unsuitable for high speed steel for example, because they cause severe oxidation of granules.

It is also known to atomize a pouring stream by impingement onto a rotating disk to make small drops or "ingots" which then solidify by contact with the surrounding atmosphere, cooling-water or oil bath, or a coolant shower. As mentioned above, in this approach the solidification does not occur by contact with the disk. That contact forms the drops or spears which can have a nearly monosize distribution.

British Patent Specification No. 519,624, hereby incorporated by reference, relates to powdered or granular metallic products constituted of solidified metallic particles derived from molten metal. It also describes a method of producing the product. These solidified metallic particles have spontaneously crystallized from a metastable undercooled state at a predetermined temperature below but close to the freezing point of the metal. The particles have substantially uniform size and composition.

To produce such particles, molten metal is discharged from a suitable receptacle in one or more streams onto a metal surface of such nature that sufficient heat is abstracted from the molten metal to lower its temperature to that of an undercooled state, that is, to a temperature which is slightly below the freezing point of the particular metal but without causing solidification or crystallization. This surface upon which the molten metal impinges can be a belt or a disk rapidly moving either linearly or rotatively, respectively. The molten metal is immediately converted into a stream of film-like proportions on the surface and the extent of the belt or disk surface is such that the molten metal makes contacts therewith for a period just sufficient to undercool it as above defined. Then the molten metal is caused to leave the supporting surface and to continue its travel in the same direction and at substantially the same speed for a sufficient distance to cause solidification. Because the undercooled stream of film-like proportions has little or no integrity, it immediately breaks up into a myriad of fine, small liquid particles which solidify to form a powdered metal.

These operations may be carried out in a vacuum or suitable atmosphere, and the myriad of fine, small liquid particles may pass through a coolant to hasten solidification of the particles or to reduce the distance needed for solidification. During solidification, surface tension causes the particles to assume a substantially spherical shape.

One known rapid solidification technique involving a centrifugal atomizing process is taught in U.S. Pat. Nos. 4,025,249 and 4,343,750, hereby incorporated by reference. It uses forced convective cooling of molten droplets to achieve cooling rates on the order of $10^5$–$10^{6°}$ C./sec. This rapid solidification state is designated RSR. Such a RS technique, in conjunction with powder metallurgy techniques for consolidation of the rapidly solidified powders, has produced materials with metastable phases, very fine grain structures, high room-temperature strength and good high temperature properties up to the point of instability of the metastable phases.

An approach to further enhance certain material properties is to blend the RS powder with ceramic powders prior to consolidation. This leads to improvement in some mechanical properties, for example, (SiC/Al), such as commercially available SiC/7090, produced by an RS/PM approach is an example of such a material. The difficulty with this approach is that it suffers from property and processing disadvantages inherent to a PM process. These difficulties include a relatively coarse reinforcement (greater than 1 micron) and/or weak metal/ceramic interfaces due to surface contaminants.

One alternative to conventional RS/PM techniques for developing metal-second phase composites is to form the ceramic phase during RS processing. U.S. Pat. No. 4,540,546, hereby incorporated by reference, describes a "Melt Mix Reaction" (MMR) process involving chemically reacting two starting alloys in a mixing nozzle in which a melt mix reaction takes place between the chemically reactable components of starting alloys to form submicron particles of the resulting compound in the final alloy. The mixing and chemical reaction is performed at a temperature which is at or above the highest liquidus temperature of the starting alloys but which is also substantially below the liquidus temperature of the final alloy, and as close to the solidus temperature of the final alloy as possible. While dispersion-strengthened alloys can be produced by this technique, there appear to be a number of inherent difficulties. First. processing is technically complex. Second, efficient mixing is important if fine dispersions are to be consistently produced. Lastly, very high degrees of superheat will be required to completely dissolve the RS alloying elements in order to produce high loading of dispersoid which necessarily accentuates particle growth, for example, one containing 10–20% dispersoid.

In U.S. Pat. No. 4,240,824, Moskowitz et al, hereby incorporated by reference, describe a process for producing a boron-containing nickel or cobalt spray-and-fuse self-fluxing alloy powder containing an internally precipitated chromium boride or nickel boride. In this patent, starting materials are alloys containing precursors of the hard precipitate, and the melt is precooled to a temperature about 50° F. higher than the viscous temperature prior to atomization. The particles are formed in the secondary atomization step, and are preferably larger than 10–15 microns in average particle size. No teaching is found for precipitating the particulate material prior to the atomization steps, or of precipitate having an average size less than 1 micron.

Narasimhan, in U.S. Pat. No. 4,268,564, hereby incorporated by reference, teaches the preparation of sheets or strips of amorphous metal containing embedded particulate matter, of 1 to 100 micron particle size, by forcing a glass-forming alloy containing particulate matter, formed in-situ, onto a rapidly moving chill surface. This technique was surprising because it had previously been believed that incorporation of particulate matter, especially of wettable particulate matter, into a molten glass-forming alloy would preclude quenching into an amorphous body due to nucleation of crystallization. Further, inclusion of particulate material in the metal melt in a melt spin process has led to rapid plugging of the orifice. The reference does not teach preparation of a rapidly solidified powder having an evenly dispersed particulate material therein. In fact, the reference specifically teaches that the particulate material is concentrated at the surface of the strip material produced.

These prior art techniques produce conventional powdered metal products.

The present invention overcomes the disadvantages of the prior art noted above including current rapid solidification technology. More particularly, the present invention permits simplification of procedures and equipment compared to the prior art. For example, the present process obviates the need for multiple furnaces and mixing and control equipment because ceramic is previously precipitated in-situ. The present invention also overcomes the need for forming multiple melts of components at very high melting temperatures. Further, high loading composites can be prepared without the necessity of achieving high levels of superheat in RS holding furnaces. One advantageous embodiment of the present invention is that two or more dispersoids may be introduced into the metal powders, e.g., one previously preformed by the process of the present invention to enhance modulus and a second resulting from conventional RS processing to increase strength. Thus low temperature strength can be enhanced by the latter and high temperature strength enhanced by the former. The present invention includes a process for producing a metal matrix material suitable for subsequent atomization, whereas conventional metal matrix composites are not believed suitable for RS atomization. Applicants' invention also provides for a cleaner particle/metal interface compared with conventional metal ceramic composites made by PM techniques using RS powders because the reinforcing particles are formed in-situ. This leads to a superior product.

This invention may also result in improvement from incorporation of a stable dispersoid into the composite which extends the high temperature working range of the composite relative to conventional RS composites that typically contain metastable phases. Moreover, incorporation of dispersoid prior to RS may provide surfaces for precipitation, consequently, a more efficient precipitation of metastable rapid solidification phases. In some cases, for example, titanium-based alloys, the addition of rare earth elements, like cerium or erbium, to the dispersoid-containin melt may result in improved scavenging of interstitials such as oxygen, leading to the formation of an additional oxide dispersoid and effective deoxidation of the matrix alloy. With these facts in mind, a detailed description of the invention follows which achieves advantages over known RS processes.

SUMMARY OF THE INVENTION

This invention relates a method for the production of metal-second phase composite materials containing a second phase, said method comprising precipitating at least one second phase material in a metal matrix by contacting reactive second phase forming constituents, in the presence of a substantially non-reactive solvent matrix metal in which the second phase forming constituents are more soluble than the second phase, at a temperature at which sufficient diffusion of said constituents into the solvent matrix metal occurs, to cause reaction of the reactive second phase forming constituents to increase the temperature to a temperature exceeding the melting temperature of the matrix metal, to precipitate the second phase in the solvent matrix metal, rapidly quenching the metal-second phase composite material at a rate in the range of approximately $10^{4°}$ C. per second to $10^{8°}$ C. per second and recovering a rapidly solidified metal-second phase composite material.

The invention further relates to a method for precipitation of a second phase in a metallic matrix, the method comprising steps of:

(a) preparing a mixture of reactive second phase forming constituents and a substantially nonreactive solvent matrix metal in which the second phase forming constituents are more soluble than the second phase;

(b) heating the mixture to a reaction initiation temperature approximating the melting point of the solvent matrix metal to initiate an exothermic reaction;

(c) permitting the exothermic reaction to further heat the mixture consuming the second phase forming constituents, and to form a uniform distribution of second phase particles;

(d) rapidly quenching the mixture at a rate in the range of approximately $10^{4°}$ C. per second to $10^{8°}$ C. per second; and (e) recovering a rapidly solidified product.

The invention further relates to a method for dispersion of second phase dispersoids in a metal matrix, the method comprising forming a reaction mixture of reactive second phase forming constituents in the presence of at least two metals, at least one of which acts as a solvent metal, in which second phase forming constituents are more soluble than the second phase dispersoids, raising the temperature of the reaction mixture to a temperature at which sufficient diffusion of the second phase forming constituents into the lowest melting solvent metal occurs to initiate a reaction of the constituents, whereby the exothermic heat of reaction of the constituents causes the temperature of the reaction mixture to exceed the melting point of the higher melting point metal permitting dispersion of the second phase dispersoid in an alloy thereof, rapidly quenching the mixture at a rate in the range approximately $10^{4°}$ C. per second to $10^{8°}$ C. per second and recovering a rapidly solidified product.

The invention further relates to a method for dispersion of second phase dispersoids in a metal matrix, the method comprising forming a reaction mixture of reactive second phase forming constituents in the presence of at least two metals, at least one of which acts as a solvent metal, in which second phase forming constituents are more soluble than the second phase dispersoids, raising the temperature of the reaction mixture to a temperature at which sufficient diffusion of the second phase forming constituents into the lowest melting solvent metal occurs to initiate a reaction of the constituents, whereby the exothermic heat of reaction of the constituents causes the temperature of the reaction mixture to exceed the melting point of the lowest melting point metal permitting dispersion of the second phase dispersoid in a mixed metal matrix, rapidly quenching the mixture at a rate in the range approximately $10^{4°}$ C. per second to $10^{8°}$ C. per second and recovering a rapidly solidified product.

The invention further relates to a method for the in-situ precipitation of at least one intermetallic material in a metallic matrix, comprising the steps of:

(a) preparing a mixture of reactive intermetallic forming constituents and a nonreactive solvent matrix metal in which the intermetallic forming constituents are more soluble than the intermetallic material;

(b) heating the mixture to a reaction initiation temperature approximating the melting point of the solvent matrix metal;

(c) permitting the resultant exothermic reaction to raise the temperature of the mixture to a temperature exceeding the melting point of the matrix metal and to consume the intermetallic forming constituents;

(d) rapidly quenching the mixture at a rate in the range approximately $10^{4°}$ C. per second to $10^{8°}$ C. per second; and (e) recovering a rapidly solidified product.

The invention further relates to a method for the in-situ precipitation of at least one ceramic material in a metallic matrix, comprising the steps of:

(a) preparing a mixture of reactive ceramic forming constituents and a non-reactive solvent matrix metal in which the ceramic forming constituents are more soluble than the ceramic material;

(b) heating the mixture to a reaction initiation temperature approximating the melting point of the solvent matrix metal;

(c) permitting the resultant exothermic reaction to raise the temperature of the mixture to a temperature exceeding the melting point of the matrix metal and to consume the ceramic forming constituents;

(d) rapidly quenching the mixture at a rate in the range approximately $10^{4°}$ C. per second to $10^{8°}$ C. per second; and (e) recovering a rapidly solidified product.

The invention further relates to a method for the in-situ precipitation of dispersoid particles of an intermetallic material and a ceramic material in a metal matrix, the method comprising the steps of:

(a) preparing a mixture of reactive intermetallic and ceramic forming constituents and a substantially non-reactive solvent matrix metal in which the intermetallic forming constituents and the ceramic forming constituents are more soluble than the intermetallic or the ceramic material respectively;

(b) heating the mixture to a reaction initiation temperature approximating the melting point of the solvent matrix metal;

(c) initiating an exothermic reaction to raise the temperature of the mixture to a temperature exceeding the melting point of the matrix metal and to consume the intermetallic forming constituents and the ceramic forming constituents;

(d) rapidly quenching the mix at a rate in the range approximately $10^{4°}$ C. per second to $10^{8°}$ C. per second; and (e) recovering a rapidly solidified product.

The invention further relates to a rapidly solidified product containing a preformed dispersion of in-situ precipitated second phase particles in a metal matrix, produced by reacting second phase forming constituents in the presence of a metal in which the constituents are more soluble than the second phase.

The invention further relates to a rapidly solidified composite containing a preformed dispersion of second phase, having a particle size of from about 0.01 to about 5 microns, in a matrix of a metal in which the constituents of said second phase are soluble and the second phase is insoluble.

DESCRIPTION OF PREFERRED EMBODIMENTS

Figure 1:
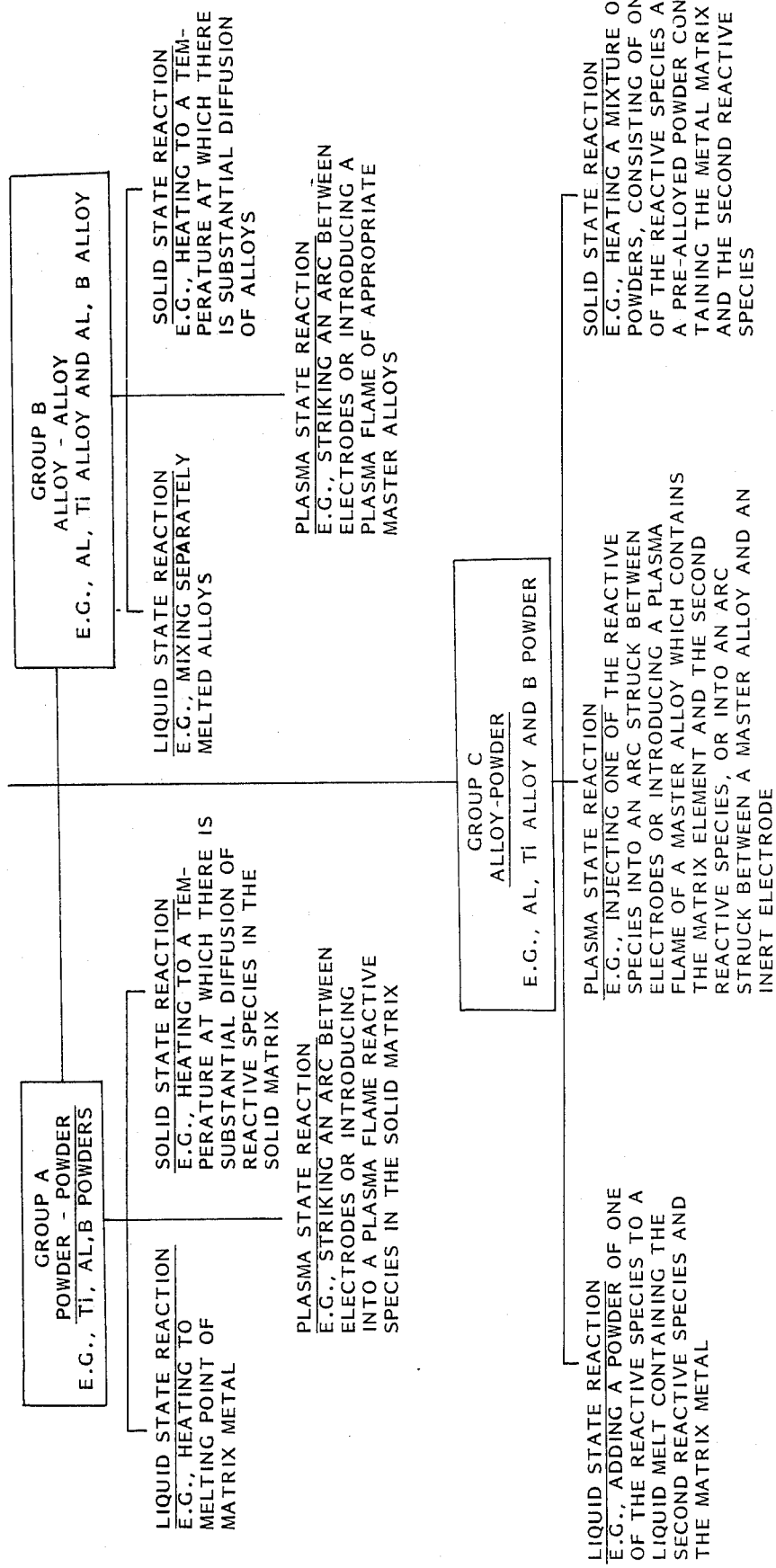
FIG. 1 represents a schematic presentation of the various reaction modes and states for an in-situ precipitation technique taught in this disclosure.

The present invention is directed to a rapid solidification process utilizing preformed metal-second phase materials, produced by an in-situ precipitation process, and a product thereof. Overall, it is the purpose of the present disclosure to describe an alternative approach to producing rapid solidification powders having dispersoids therein by a less complex method, to produce alloys with improved mechanical properties compared to those produced by known techniques while maintaining known advantages. The method of production and composition of the rapid solidification product of the present technique differ from prior art in that at least one dispersed phase preexists in the alloy product prior to the rapid solidification treatment, in that the process circumvents the need for an excessive degree of superheat required in order to dissolve alloying elements and in that the process permits inclusion of higher amounts of dispersoids. Further, the invention avoids need for controlling excessive reaction exothermicity released during formation of dispersoids in the prior art, and allows greater latitude in selection of dispersoids and reactant concentration.

Thus, it is a particular purpose of this invention to provide rapid solidification products containing in-situ precipitated second phases in a metallic matrix composite. This approach provides an alternative to conventional ingot metallurgy or powder metallurgy techniques as a means of preparing composite for rapid solidification atomization. The importance of this distinction resides in the fact that most composites prepared by conventional techniques are unsuitable for atomization. The advantages of the present method and product of this invention will become more readily understood by consideration of the following description and examples.

The in-situ precipitation technique is described in detail in parent application Ser. No. 662,928 hereby incorporated by reference, filed Oct. 19, 1984, of which this application is a continuation-in-part.

A novel process is taught for the in-situ precipitation of fine particulate second phase materials such as ceramics or intermetallics, such as refractory hard metal borides or aluminides, within metal and alloy systems to produce a metal matrix composite suitable for use as a starting material for rapid solidification. However, the process described may also be employed for introducing larger particles of the ceramic material into the chosen matrix, up to the point at which such larger particles result in component embrittlement, or loss of ductility, etc.

A method is taught herein whereby second phase forming elements are caused to react in a solvent metal to form a finely-divided dispersion of the second phase material in the solvent metal matrix. In accordance with the present invention, the second phase-forming constituents most easily combine at or about the melting temperature of the solvent metal, and the exothermic nature of this reaction causes a very rapid temperature elevation or spike, which has the effect of melting additional metal, simultaneously promoting the further reaction of the second phase constitutents.

Alternatively, in systems where the reactive elements have substantial diffusivity in the solid matrix metal, the reaction may be initiated at temperature well below the melting point of the matrix metal. Thus, a solid state initiation is possible, wherein a liquid state may or may not be achieved until the exothermic spike has occurred.

Exemplary of suitable second phase ceramic precipitates are the borides, carbides, oxides, nitrides, silicides, oxynitrides, oxysulfides, and sulfides. Suitable second phase ceramic precursors include all of the elements which are reactive to form ceramics, including, but not limited to, transition elements of the third to sixth groups of the Periodic Table. Particularly useful ceramic-forming or intermetallic compound forming constituents include aluminum, titanium, silicon, oxygen, nitrogen, carbon, sulfur, boron, molybdenum, tungsten, niobium, vanadium, zirconium, chromium, hafnium, yttrium, cobalt, nickel, iron, magnesium, tantalum, thorium, scandium, lanthanum and rare earth elements. Particularly useful additional intermetallic-forming elements include copper, silver, gold, zinc, tin, platinum, manganese, lithium and beryllium.

As the matrix metal, or solvent metal, one may use any metal capable of dissolving or sparingly dissolving the constituents of the second phase, and having a lesser capability for dissolving the second phase precipitate. Thus, the matrix metal component must act as a solvent for the specific reactants, but not for the desired second phase precipitate. It is to be noted that the matrix metal acts primarily as a solvent in the process of the present invention, and that the constituents of the second phase precipitate have a greater affinity for each other than either has for the solvent metal. Thus, the solvent metal is substantially non-reactive. Additionally, its important that the second phase forming reaction releases sufficient energy for the reaction to go substantially to completion. It must be noted that while a large number of combinations of matrices and dispersoids has been alluded to, the in-situ precipitated phase, ceramic or intermetallic, in any one given matrix is limited and must adhere to these criteria.

Suitable matrix metals include aluminum, nickel, titanium, copper, vanadium, chromium, manganese, cobalt, iron, silicon, molybdenum, beryllium, ruthenium, silver, gold, platinum, magnesium, lead, zinc, tin, niobium, tantalum, hafnium, zirconium, tungsten, antimony, bismuth and alloys of such metals. When alloys are utilized, one may retain the beneficial properties of said alloys, and increase the modulus of elasticity, high temperature stability, and wear resistance, although some loss of ductility may be encountered in certain soft alloys. For example, 7075 aluminum alloy, containing from about 5 percent to about 40 percent by weight titanium diboride, shows the same beneficial effect of age-hardening as 7075 alloy alone, but exhibits a substantial increase in modulus of elasticity, higher temperature capability, greater high temperature stability, and extremely high wear resistance. Further, the composites of the present invention may be fabricated in conventional fashion, by casting, forging, extruding, rolling, machining, etc.

Varying amounts of second phase material may be incorporated into the composite material depending upon the end use and the properties desired in the product. For instance, to produce dispersion strengthened alloys having high modulus, one may utilize a preferred range of from about 0.1 to less than about 30 percent by volume and more preferably of from about 10 percent by volume to about 25 percent by volume of second phase. However, the second phase volume fraction for dispersion strengthening may be varied considerably, to produce a composite with the desired combination of properties, within the range of from about one percent by volume up to the point at which ductility is sacrificed to an unacceptable extent. The primary determining factors of the composition of the composite will be the intended use of the products, that is, for use such as cutting tools the properties will be the wear and chip resistance of the composite material produced. It is possible to effectively tailor the composition to achieve a range of desired properties by controlling the proportions of the reactant and solvent materials.

It is though that the introduction of previously synthesized fine second phase particles directly to a molten metal bath is technically difficult and is believed to produce metal products having less desirable properties upon solidification due to a deleterious layer, such as a oxide, on the surface of each second phase particle at the time of or prior to introduction into the molten metal bath. The second phase particles of the present invention, being formed in-situ, do not possess this deleterious coating layer. Thus, the present invention produces metal products having unexpectedly superior properties.

Three basic reaction modes have been identified in accordance with the present invention as illustrated in FIG. 1. In the first mode, Group A of FIG. 1, the starting materials constitute individual powders of each of the solvent metal and the individual constituents of the second phase to be formed. For example, one may react a mixture of aluminum, titanium, and boron, to form a dispersion of titanium diboride in an aluminum matrix.

In the second mode of the method, Group B of FIG. 1, individual alloys may be reacted, one such alloy comprising an alloy of the solvent metal with one of the constituents of the second phase, and the other comprising an alloy of the same solvent metal, or another metal with which the solvent metal readily alloys, and the other constituent of the second phase. As an example, of using two alloys of a common metal a mixture of aluminum-titanium alloy with aluminum-boron alloy may be reacted, to form a dispersion of titanium diboride in aluminum. This alloy-alloy reaction route may, in some cases, be relatively slower than the elemental route, yet may offer economic advantages because the alloys utilized can be cheaper than the elemental powders. In this case, the preferred form is that of separately melting master alloys containing the chosen elements and mixing them in the molten state, forming a mass in which the molten matrix metal or alloy acts as a liquid solvent for the constituents of the second phase.

The third reaction mode, Group C of FIG. 1, constitutes a combination, or intermediate, of the first two modes discussed above. Thus, one may react a premixed alloy containing one reactive species and the matrix metal, with an elemental powder of the second reactive species, such as combining an aluminum-titanium alloy with elemental boron powder. This reaction mode may be relatively more expensive than the alloy-alloy reaction mode, but offers a more rapid reaction, which in turn permits formation of finer particle precipitates than obtainable by the alloy-alloy route. However, the alloy-elemental powder reaction mode could be relatively less expensive, although slower, than the elemental powder mode, in most cases.

Moreover, the three reaction modes may occur in different physical states. Each of the first two basic modes of the solvent assisted reaction may occur in three physical states. The elemental powders can react to form the desired second phase via diffusion of the reactive species through the liquid solvent or, in cases where diffusion is very rapid, in a solid state, or in a plasma state achieved by striking an arc between electrodes of the two starting ingredients or by introducing the compacted and granulated starting mixture into a plasma flame. The third reaction mode also may function in all three states. That is, the reaction of an alloy with an elemental powder may be conducted as a liquid state reaction, a solid state reaction, or in the plasma state. The full range of reaction states is shown in FIG. 1.

It is also to be noted that complex compounds, as well as plural second phases, may be precipitated by these three reaction modes. Thus, solvent matrix combinations with complex second phases such as titanium zirconium boride, are possible to prepare.

Figure 2:
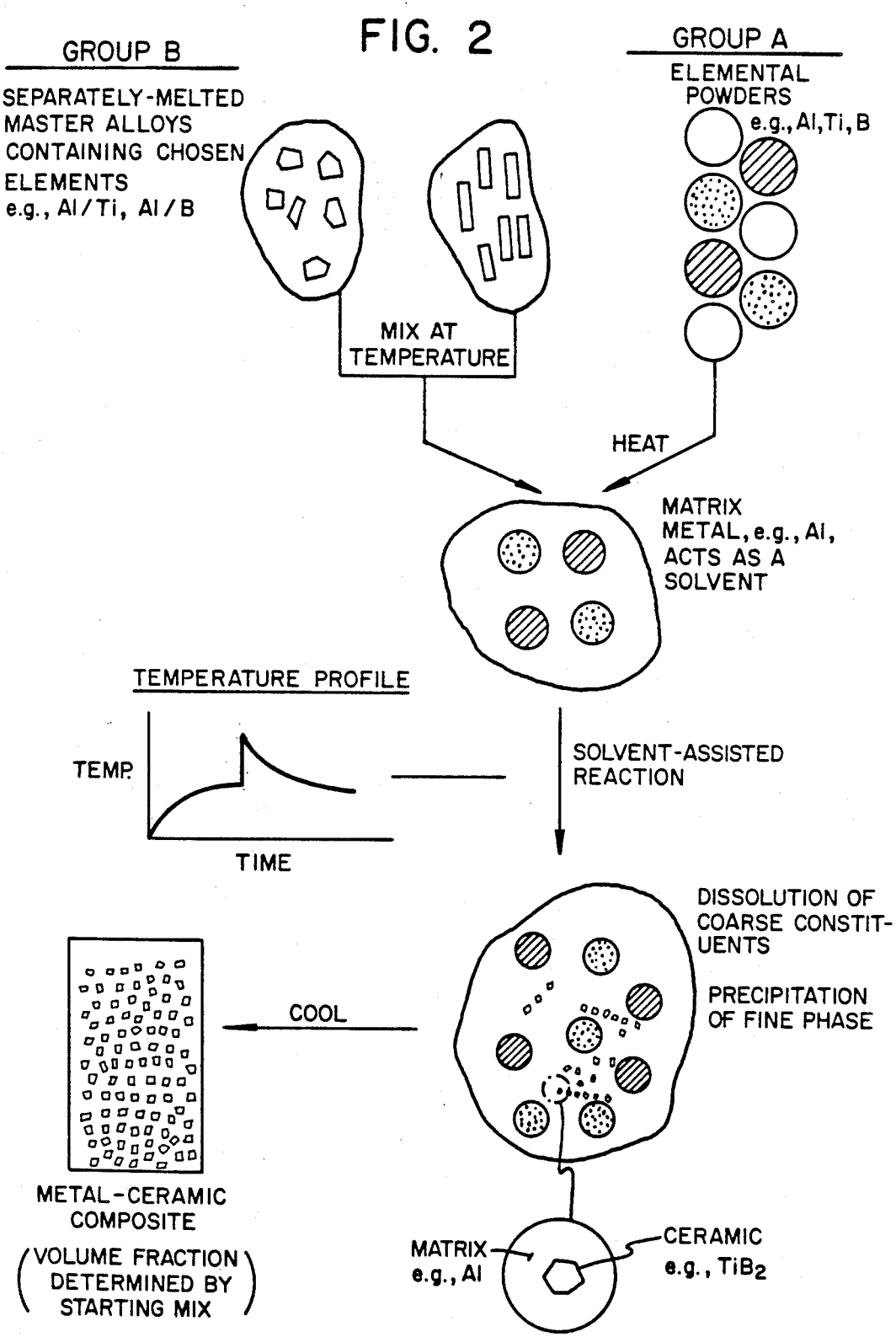
FIG. 2 represents a schematic presentation of two of the basic reaction modes for an in-situ precipitation technique.

It is particularly noted that the prior art teaches that the combination of elemental metal or alloy powders, particularly of a coarse particulate size, would yield intermetallic compounds. In fact, conventional techniques for forming intermetallics involve for example, reacting a mixture of titanium and aluminum, to form titanium aluminide, and a mixture of boron and aluminum to form aluminum diboride. Thus, it would be expected that a mixture comprising powders of titanium, aluminum, and boron would yield an aggregate agglomeration of titanium aluminide, aluminum diboride, and possibly, titanium diboride. In contrast, the present invention provides for the formation of essentially just one finely dispersed precipitate of two reactive components in a matrix of the third component. It is important that the second phase precipitate material not be soluble in the solvent metal, while the constituents of the second phase, individually, are at least sparingly soluble in the solvent metal. Thus, the exothermic dispersion reaction mechanism depends upon a certain amount of each second phase forming constituent dissolving and diffusing in the solvent metal, and while in solution (either liquid or solid state), reacting exothermically to form the insoluble ceramic, which precipitates rapidly as a very fine particulate. This is illustrated in FIG. 2. The solvent metal provides a medium in which the reactive elements may diffuse and combine. Once the initial reaction has occurred, the heat released by the exothermic reaction causes additional matrix material to melt thereby enhancing diffusion of reactive components in the solvent metal, and completing the reaction.

Figure 3:
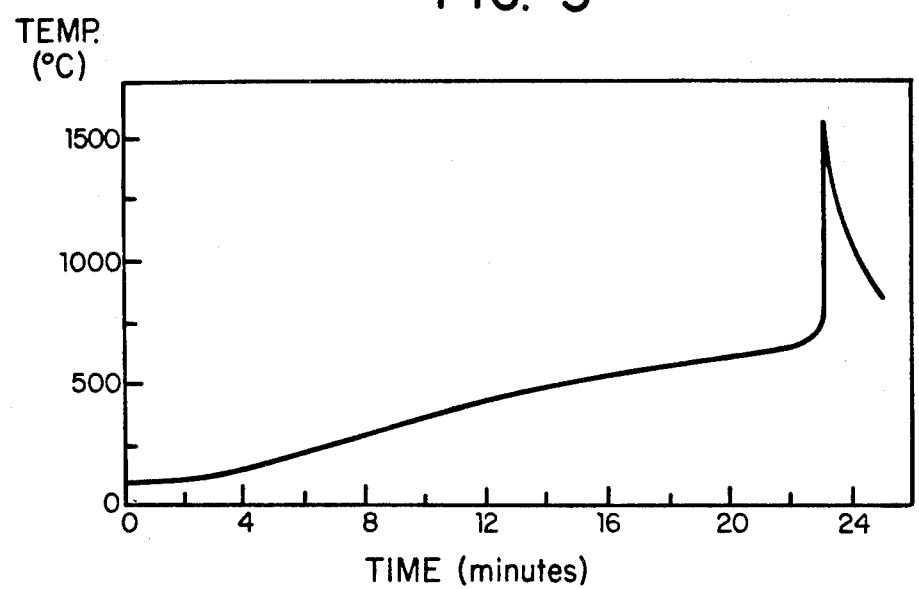
FIG. 3 represents a typical time-temperature profile of the solvent assisted reaction of the mentioned in-situ precipitation technique.

This is illustrated by FIG. 3, which demonstrates a temperature trace of a mixture constituting 22 weight percent titanium, 10 weight percent boron, and 68 weight percent aluminum powders. The mixture is placed in a crucible that is placed in a furnace which is heated to 735° C. to heat more than a localized portion of the mixture to initiate reaction, unlike known techniques, as measured by the control thermocouple on the furnace. A thermocouple that is placed against the specimen shows a plateau indicating absorption of energy, attributable to localized melting, and the initiation of substantial diffusion of the reactive components.

The temperature trace then illustrates the exothermic initiation of the reaction of the reactive constituents, and the very rapid temperature increase associated with it. As shown by the temperature trace illustrated in FIG. 3, extremely high temperatures may be achieved in very short periods of time. During this time frame, essentially all of the reactive components in the solvent metal react to form the insoluble second phase, such as a ceramic, which immediately precipitates.

The cool-down period following initiation of the reaction and consumption of the reactive constituents is important to achieving very small particle size, and limiting particle growth. It is known that at high temperatures, it is possible for the second phase particles to grow, for example, by dissolution precipitation mechanisms. This should be avoided, because of the negative effect of large particle sizes on ductility. The cool-down or quenching of the reaction is, in a sense, automatic, because once the second phase forming constituents are completely reacted, there is no further energy released to maintain the high temperatures achieved. However, one may control the rate of cool-down to a certain extent by control of the size and/or composition of the mass of material reacted. That is, large thermal masses absorb energy, and cool down more slowly, thus permitting growth of larger particles, such as may be desired for greater wear resistance, for example, for use in cutting tools. It is recognized that if it is desired to rapidly cool the reaction mass to an intermediate temperature, one may achieve this by the introduction of a stream of cool inert gas, such as helium. Thus, the temperature may be rapidly reduced from the maximum temperature attained to a temperature where particle growth is minimal.

The reaction mass may be subjected to conventional RS immediately following the dispersoid forming reaction. Alternatively, the reaction mass may be solidified, alloyed, or further processed for subsequent RS. Techniques available for RS include melt spinning or atomization, to produce a ribbon or droplet form matrix metal having submicron ceramic or intermetallic particles dispersed therein. Conventional RS processing is taught in J. R. Pickens et al, *The Effect Of Rapid Solidification On The Microstructure And Properties Of Aluminum Powder Metallurgy Alloys*, Rapid Solidification Processing, Principles and Technologies III, pp. 150–170, Claitors (1982) and M. Cohen et al, *Rapid solidification Processing-An Outlook*, Rapid Solidification Processing, Principles and Technologies, II, pp. 1–23, Claitors (1980), hereby incorporated by reference. RS processing concerns liquid alloys subjected to cooling rates on the order of about $10^{4°}$ C. per second to $10^{8°}$ C. per second. Several techniques are well established in the state of the art to economically fabricate RS alloys as ribbons, filaments, wires, flakes or powders alone or in combination in large quantities. With this in mind the discussion continues.

The most common methods of consolidation of RS processing powders are hot isostatic pressing and hot extrusion. Superplasticity may be involved in some cases and, if so, it permits isothermal forging of extruded billets into near-final shapes. Of course, the latter feature is also embodied in hot isostatic pressing.

Incremental solidification (otherwise called layer glazing) provides a way of building up a three-dimensional shape by means of rapidly solidified layers. The rapid solidification and consolidation can also be carried out concurrently. Whatever the method of consolidation, the structure/property relationships stemming from the rapid solidification will depend upon the efficacy of the consolidation process as well as on the final heat treatment.

The reaction initiation temperature has generally been found to be relatively close to the melting temperature of the solvent metal utilized in liquid state reactions. For example, in the production of titanium diboride in an aluminum matrix, the reaction proceeds at a temperature around 670° C., or very close to the melting point of the aluminum solvent. It should be noted that in the absence of a solvent metal, the reaction of titanium and boron to form titanium diboride was not observed to activate below a temperature of about 900° C. While it is unnecessary to actually reach the melting temperature to initiate the reaction, a temperature where localized melting occurs must be achieved, or where substantial diffusion of the reactive species in the solvent metal can occur. In some cases, as temperature increases, it is possible for the starting constituents to diffuse into the solvent matrix metal, forming an alloy therewith having a lower melting temperature than the matrix metal. Thus, reaction initiation temperature is lowered.

Regarding impurities, the solvent metal may be alloyed in conventional manner, while in the reactive constituents, large amounts of alloying elements or impurities may caused problems in certain instances. For example, the presence of large amounts of magnesium in boron may inhibit the formation of titanium diboride in an aluminum matrix by forming a magnesium-boron complex on the surface of the boron particles. This limits diffusion of the boron in the matrix. However, the presence of magnesium in the aluminum does not have this effect. That is, boride forming materials in the boron itself may inhibit the desired dissolution or diffusion of the boron and its subsequent reaction to form titanium diboride.

It is also to be noted that in accordance with the present invention, the complex precipitation of a plurality of systems may be caused. Thus, it is possible to precipitate complex phases, such as $Ti(B_{0.5}C_{0.5})$, or alternatively, to precipitate a mixture of titanium diboride and zirconium diboride in an aluminum matrix, in accordance with the reaction:

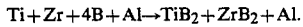
$Ti+Zr+4B+Al\rightarrow TiB_2+ZrB_2+Al.$

It is also possible to achieve a low temperature solvent assisted reaction in a metal matrix which has a high melting temperature by alloying or admixing the high melting solvent metal with a lower melting metal. For example, titanium diboride has been precipitated at very low temperatures, such as 620° C., in cobalt, chromium, and nickel matrices, by including up to 20 percent by weight aluminum. In the absence of the alloying aluminum, the reaction requires temperatures of about 900° C. or greater.

In accordance with the present invention it has been found that the powders need not be compacted prior to firing, but doing so allows easier diffusion and thus initiation at lower temperatures. For instance, loose powder mixtures of aluminum, titanium and boron do not react until approximately 660° C. whereas highly compacted powders react at approximately 620° C. This is due to localized melting, and increased diffusion, which are possible when the powders are in close proximity.

Porosity of the final composite can be minimized by a vacuum degassing operation prior to initiation of the reaction. The degree of vacuum applied and temperature of the degassing step is determined purely by the kinetics of evaporation and diffusion of any absorbed moisture or other gases. High vacuum and elevated temperatures aid the degassing operation. In the case of titanium, aluminum, and boron mixtures, however, the pre-reacted compact must not be exposed to temperatures above 300° C. for prolonged periods of time as this will induce the volatilization of some components and induce the formation of titanium aluminide by solid state diffusion. This is undesirable because it forms as large plates which are detrimental to mechanical properties, and also reduces the chemical driving force for the formation of the titanium diboride. Nonetheless, conversion of titanium aluminide to titanium diboride in the presence of boron and aluminum can occur slowly if the components are held at temperatures above the melting point of aluminum.

The starting powders must be protected from extensive oxidation due to exposure to the atmosphere, as this will restrict the diffusion of the components into the metal matrix, and the reaction should preferably be carried out under an inert gas to avoid oxidation at high temperatures.

Absent the degassing step, the composite formed may be relatively porous, and lower in density than the matrix metal. In such a state, this material may be referred to as "sponge", may be of a high second phase concentration and may be added to a measured volume of matrix metal (either the same or different from the matrix in which the dispersoid was first formed) to achieve a specifically desired second phase concentration.

A method is also taught whereby particle growth of the ceramic can be controlled. As is known in the art the elevated temperatures produced, as for example, by the exothermic spike, will remain higher and subside more slowly for a large mass of material than for a smaller mass. These conditions of high temperature for long periods of time favor particle growth of ceramics. Thus the formation of relatively small volume concentrates or "sponges" of in-situ formed ceramic will facilitate quicker cooling and limit particle growth of the ceramic phase as will be discussed hereinafter.

The particle size of the powders utilized in the elemental powder mode does not appear to be critical. It has been found, however, that particle size of the second phase reaction product is dependent upon heat-up rate, reaction temperature, cool-down rate, and crystallinity and composition of the starting materials. Appropriate starting powder sizes may range from less than 5 microns to more than 200 microns. For economic reasons, one normally may utilize larger particle size powders. It has been found that the particle size of the precipitated second phase in the matrix may vary from less than about 0.01 microns to about 5 microns or larger, dependent upon factors cited above.

It has been found that some specific reactant properties have a greater impact than powder particle size on the particle size of the second phase produced. For example, the use of amorphous boron may result in the precipitation of a finer particle size titanium diboride than does the use of crystalline boron of otherwise comparable nature. The precipitation of specific particle size second phase may be selectively controlled by proper control of starting composition, temperature of reaction, and cool-down rate.

The production of relatively porous composites, containing high concentrations of the second phase, also provides a technique for the production of second phase dispersoids of high purity ceramic powders of desired particle size. These dispersoids may be introduced in the required concentration into another volume of metal. This may be achieved by selective disdilution of the matrix metal, yielding a suspension of second phase particles in the dilution medium. If the dilution medium is another metal, one may obtain a dispersion of a second phse in a matrix in which it may not be directly precipitated. For example, titanium can be reinforced by precipitating titanium diboride in aluminum, and subsequently alloying the titanium diboride/aluminum composite to produce a reinforced titanium aluminum matrix.

One process for forming the subject composite materials comprises providing a substantially molten or liquid mass of a metal and then adding at least one of the constituents or elements of the desired second phase material to the molten mass. In the presence of the reactive elements, the exothermic in-situ precipitation reaction is initiated to form and disperse finely divided particles of second phase material in the molten metal. Thus, in one embodiment, the molten metal mass could contain one of the constituents of the desired second phase material, for example, as preformed alloy, and one or more constituents would subsequently be added. Alternatively, all of the constituents could be added to the molten mass eithe rsequentially or simultaneously. One mode of practicing this process is to compact powders or chips of the unreacted constituents of the second phase material and then add the compacted constituents to the molten metal mass.

Preferably, the constituent or constituents are added incrementally to the molten metal mass along with sufficient solvent metal to allow the reaction to easily proceed. With this procedure, the metal of the molten mass could be different than the added solvent metal and thus need not be a solvent for the constituents.

In this latter process, it is preferable that the amount of each constituent added is such that essentially all of the constituents are consumed in the precipitation reaction, that is, that essentially no unreacted constituent remains after the completion of the reaction. In most instances, this requirement can be met if stoichiometric quantities of the constituents are available in the molten mass of metal.

An advantage of this process is that, if the constituents are added to a relatively large pool of molten metal, for example, a step-wise or incrementally addition, the temperature of the molten mass will not change significantly during the course of the addition. That is, the large temperature spike illustrated in FIG. 3, and thus potential particle growth of the second phase particles due to elevated temperatures, will occur locally and will be minimized in the bulk of the melt. Such an addition procedure is also advisable from a safety standpoint to prevent the rapid evolution of significant quantities of heat which could cause metal to the splattered, sprayed or boiled from the containment vessel. Another advantage is that the exothermic reaction of the constitutents, forming the second phase material, occurring in the molten mass creates a mixing effect. It aids in dispersing the second phase material throughout the mass. In addition, by having the mass molten or liquid upon addition of the constituents, the constituents are rapidly heated to reaction temperature. This promotes formation of fine second phase particles. A further important consideration of this process is that because a molten mass of matrix metal is utilized, the matrix metal need not be formed from powdered metal, but may be formed from ingot, scrap, etc. This results in a significant saving in material preparation costs.

As in the more general procedures described previously, in selecting the constituents and the matrix metal for the composite materials produced by the abovedescribed process, it is important that the formed second phase material have a low solubility in the molten mass, for example, a maximum solubility of 5 weight percent, and preferably 1 percent or less, at the temperature of the molten mass. Otherwise, significant particle growth of the second phase material may be experienced over extended periods of time. For most uses of the composite materials, the size of the second phase particles should be as small as possible, and thus particle growth is undesirable. When the solubility of the formed second phase material in the molten mass is low, the molten mass with dispersed second phase particles can be maintained in the molten state for a considerable period of time without growth of the second phase particles. From example, a molten mass of aluminum containing dispersed titanium diboride particles can be maintained in the molten state for three to four hours without appreciable particle growth.

With certain combinations of constituents and matrix metals, one or more of the constituents may tend to react with the molten matrix metal as the added constituent is heated up to the temperature at which the ceramic forming reaction occurs. This reaction product of the constitutent and the matrix metal may be undesirable in the final composite and, in any event, reduces the amount of constituent available for the insitu ceramic forming reaction. For example, when adding titanium and boron to molten aluminum, titanium aluminides (e.g., $Al_3Ti$) and aluminum diboride may be formed as the titanium and boron are heated to reaction temperature. When titanium reacts with aluminum, the formed titanium aluminide, if present as large plates, may be deleterious in the final composite and results in a lower than desired concentration of titanium diboride.

To help prevent the formation of such undesirable reaction products, the added constituents or constituents may be provided with a thin barrier layer retard contact of the constituents with the molten matrix metal until the constituents reach the reaction initiation temperature at which the formation of the desired ceramic material begins. The composition of such a barrier layer would, of course, depend upon the particular materials being utilized and should be selected so that undesirable products are not generated. Generally, the barrier layer should prevent or at least retard wetting of the added constituents by the molten matrix metal. In the formation of composites such as titanium diboride in aluminum, boron nitride and polymeric materials such as halogenated polyolefins may be suitable for the barrier layer.

Alternatively, the undesirable compounds formed from the reaction of one constituent and the matrix metal can be essentially eliminated in some instances by the addition of more of the other constituent. For example, the titanium aluminide formed in the titanium diboride-aluminum composite can be removed by adding additioal boron to the molten mass. The boron can be in the form of elemental boron, boron alloy or boron halide. Such a boron addition also provides teh benefit that any free titanium, which can adversely effect the viscosity of the melt of casting operations, is converted to titanium diboride.

Examples 1 and 2 illustrate the precipitation of fine particles of titanium diboride in aluminum by powder-powder mode reactions, in the liquid state and in the solid state. In the non-limiting examples, percentages are by weight unless otherwise specified.

EXAMPLE 1

Figure 4:
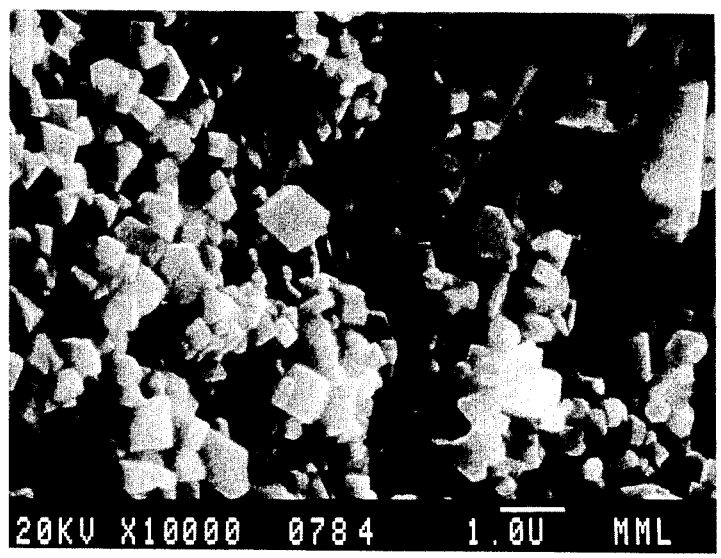
FIG. 4 constitutes a photomicrograph of a dispersion of titanium diboride in aluminum, prepared according to the in-situ precipitation technique mentioned above.

A mixture of 34 percent by weight of titanium powder, 16 percent by weight of boron, and 50 percent by weight of aluminum, is isostatically compacted to 38,000 pounds per square inch. The compacted artifact is then heated in a furnace set at a temperature of 800° C. Upon reaching approximately 670° C., a rapid increase in temperature to approximately 1250° C. is noted. The rate of increase in temperature is very rapid (greater than 900° C. per minute) followed by a fast cool down rate of approximately 400° C. per minute. On subsequent examination the sample is found to contain a fine dispersion (0.1–3 microns) of titanium diboride particles in an aluminum matrix. A photomicrograph of this composite is shown as FIG. 4.

EXAMPLE 2

A mixture of 20.5 percent titanium, 9.5 percent boron and 70 percent by weight cobalt is isostatically pressed to 40,000 pounds per square inch and heated in a furnace. A highly exothermic reaction occurred at 800° C., with a temperature rise to about 1600° C. Subsequent x-ray analysis identified the presence of titanium diboride in a cobalt matrix. It is shown here that if sufficient diffusion of the reactive species can occur, the initiation temperature can be below the melting point of the matrix metal, which in this case is 1495° C., and the reaction may occur in the solid state.

The alloy-alloy reaction, in the liquid state, is exemplified by Examples 3 and 4, described below.

EXAMPLE 3

Two separate aluminum alloys, one containing 10 percent titanium, and the other 4 percent boron, by weight, are placed in an alumina crucible together and heated to 1400° C. for one hour under an argon atmosphere. Mixing of the melted alloys occurred through diffusion and thermal effects. The experiment is performed at 1400° C. to ensure that all of the titanium and boron are dissolved, thereby permitting the titanium diboride to fully precipitate, being considerably less soluble than the individual elements. Subsequent SEM/EDS analysis of the metal matrix composite produced identified a submicron $TiB_2$ dispersion in the aluminum matrix. While this experiment is intended to completely dissolve the titanium aluminide and aluminum boride such that all the titanium and boron are held in solution in the aluminum, it is recognized that because of its limited solubility titanium diboride would precipitate at any temperature above the melting point of the solvent metal, even if all of the alloys were not dissolved.

EXAMPLE 4

To support the contention that it is not necessary to fully dissolve the titanium and boron in the alloys, three equivalent experiments to Example 3, are performed, except that the maximum temperatures achieved are limited to 1200° C., 1000° C. and 800° C., respectively. As in Example 3, finely dispersed $TiB_2$ particles are observed in the alumninum matrix in all cases.

The following Example 5 describes the production of aluminum/titanium diboride composites by alloy-alloy reaction, in the plasma arc.

EXAMPLE 5

In this example, the reaction is achieved by striking an arc between two electrodes, each containing the metal matrix and one of the reactive species, in a closed vessel. The relative positions of the electrodes is adjusted to achieve passage of the arc. The said electrodes may also be rotated to achieve even melting. Atomizing the homogenized molten metal into powder can be achieved in air, but is preferably performed in a non-reactive atmosphere such as an inert gas or a vacuum. Alternatively, the molten metal may be collected in a heated container placed below the arc to obtain an ingot.

The reaction between the ceramic constituents within the arc yields a ceramic compound which is mixed with the matrix metal. Due to the very rapid heat up and cool down rates associated with this process, a distribution of very fine ceramic particles in the metallic matrix is achieved. Striking an arc in the above manner between two electrodes, one of which contains aluminum and titanium and the other aluminum and boron, results in the formation of a fine dispersion of titanium diboride in a molten aluminum droplet which solidifies as it drops through the inert gas. The powder thus produced can be subsequently processed by conventional powder metallurgical techniques. In a different variant of this process, the molten metal droplets are collected in a heated crucible to produce an ingot for conventional metal working operations. In yet another variant the droplets are collected on a chilled rotating drum to produce metal-second phase flakes.

The following example teaches the influence of amorphous boron on the particle size of titanium diboride precipitated in an aluminum matrix.

EXAMPLE 6

An identical mixture (but for the use of amorphous boron instead of crystalline boron) as that described in Example 1 is prepared (that is, approximately 34 percent by weight of titanium, 16 percent by weight of boron, and 50 percent by weight of aluminum), compacted, and heated in a furnace. At a temperature of about 620° C., a rapid exotherm is noted. Subsequent examination revealed a distribution of very fine (0.01–1.0 micron) titanium diboride particles in an aluminum matrix.

The high concentration composite prepared in either Example 1 or Example 6 is suitable for use as a ceramic sponge for subsequent dilution to achieve dispersion hardening of metal/alloy systems.

The following examples teach the use of one matrix solvent to induce precipitation in a second, higher melting point matrix.

EXAMPLE 7

A mixture of 16 percent by weight of aluminum, 56 percent by weight of chromium, 20.6 percent by weight titanium, and 9.4 percent by weight of boron is compacted and subsequently heated in a furnace. On attainment of a temperature of about 620° C., a rapid reaction occurs, resulting in a temperature increase to over 800° C. and melting of the chromium matrix. The temperature-time curve showed a double peak, indicating an exothermic reaction in aluminum (which typically occurs between 600°–680° C.) and a subsequent reaction in the chromium. The lower melting matrix therefore acts as a "low temperature initiator" for the reaction, which released heat and induced further reaction in the higher melting compound. The composite produced is identified as titanium diboride in a matrix of chromium-aluminum alloy.

EXAMPLE 8

A mixture of 20.6 percent by weight of titanium, 9.4 percent by weight boron and 70 percent by weight of chromium is compacted to 40,000 pounds per square inch, and then heated in a furnace. A rapid exothermic reaction is noted at approximately 880° C. This temperature is about 260° C. above that at which the same proportions of titanium and boron react when 20 percent of the matrix is composed of aluminum. As in the case of Example 7, titanium diboride is identified by x-ray analysis.

The following examples illustrate various characteristics and aspects of the invention as discussed hereinabove.

EXAMPLE 9

An experiment is conducted whereby zirconium diboride is precipitated in a matrix of copper. A mixture of approximately 24 percent zirconium, 11 percent boron, and 65 percent aluminum powders by weight is compacted, and, a portion thereof is then heated in a furnace. On attainment of a temperature of 830° C., rapid reaction occurred to a temperature maximum of about 970° C. Subsequent x-ray and SEM analysis showed the presence of zirconium diboride in a copper matrix. This sponge is then added to a melt of aluminum to produce a Cu containing aluminum alloy with 2% $ZrB_2$ uniformly dispersed throughout the melt. The remaining unreacted portion of the compact is crushed and incrementally added to a molten bath of Ni to produce a Cu containing Ni alloy in 3% $ZrB_2$.

EXAMPLE 10

An experiment is conducted, whereby molybdenum disilicide is precipitated in an aluminum matrix. A mixture of approximately 7.5 percent silicon, 12.5 percent molybdenum, and 80 percent aluminum powders by weight is compacted and subsequently heated in a furnace. On attainment of a temperature of approximately 640° C., a sudden exotherm is noted. Subsequent x-ray and SEM analyses confirmed the presence of molybdenum disilicide in an aluminum matrix.

EXAMPLE 11

A mixture of 20.4 percent titanium, 9.6 percent boron and 70 percent by weight of lead is compacted to 40,000 pounds per square inch and then heated to 450° C. No exotherm is noted and subsequent x-ray analysis identified only the unreacted elemental powders. This behavior does not form part of this invention because it illustrates, as others have shown, that there is no solubility of boron in lead, and thus no diffusion of boron in the lead can occur to react with the titanium. In contrast to such behavior, a silicon, titanium and lead mixture does produce titanium disilicide in lead, as both silicon and titanium have a finite solubility in lead which enables diffusion and reaction to occur.

The preceeding description refers to preparation of a reinforced alloy with desired properties according to the previously mentioned parent application. These alloys in their own right have superior properties to conventional alloys, that is,, metal-matrix composites, of equivalent chemical composition prepared by conventional RS or powdered metallurigical techniques.

The present produce is either atomized directly by conventional RS techniques or is initially alloyed further to capitalize on the rapid cooling-derived benefits achieved by conventional RS. This approach can yield material which advantageously contains both the "stable" dispersoids from the previous in-situ reaction and the "stable"/"metastable" RS products. The combination may yield superior material properties. The product can then be degassed and consolidated to produce wrought alloys with superior properties over conventional composites. Alternatively, the present product can be combined with powders, fibers, or other alloys or second phase materials not of this invention to further improve certain composite properties, for example, wear characteristics. Filaments or whiskers can also be incorporated to achieve anisotropic properties. The improved properties of the novel composite may offer weight-savings in stiffness limited applications, higher operating temperatures and associated energy efficiency improvements, and associated energy efficiency improvements, and reduced wear in parts subject to erosion. A specific application of such materials is in construction of turbine engine components, such as blades.

Examples utilizing the RS cooling of an insitu precipitated second phase dispersoid in a metal matrix follow:

EXAMPLE 12

A mixture of 34% by wt. titanium powder, 16% boron powder, and 50% aluminum is isostatically compacted to 38,000 psi. The compacted artifact is then heated, crushed and incrementally added to a melt of aluminum 7075 held in the RS holding crucible to obtain a final composition of 15 volume percent $TiB_2$. This melt containing the dispersoid is then rapidly solidified to produce rapidly solidified powders. A portion of these powders is then degassed and compacted to a final shape. A second portion is subsequently worked by extrusion yielding a wrought shape. A third portion of the rapidly solidified powder is combined with coarse $TiB_2$ powder and compacted by conventional powder metallurgy techniques to further enhance wear characteristics.

EXAMPLE 13

As in Example 12, a 50% $TiB_2/Al$ composite is prepared. A portion of the alloy is diluted with aluminum to yield a 15% $TiB_2/Al$ composite either in a conventional casting operation or in the holding furnace of a RS unit. In either case, the 15% composite is then alloyed with Zn, Mg, Fe, Si, Mn and Cr to yield a matrix alloy of composition Al-0.25Zn-4.5Mg--0.4Fe-0.4Si-0.7Mn-0.2Cr (wt %). This alloy is superheated to dissolve all the alloying elements and the composite containing about 15% of undissolved $TiB_2$ is atomized, yielding the above mentioned RS alloy reinforced with $TiB_2$.

EXAMPLE 14

A mixture of 34% Ti, 16% B, and 50% Al powders is compacted at 38,000 psi. This mixture is then added to the RS holding furnace containing sufficient molten aluminum to yield a 10% composite of $TiB_2$ in Al. Upon addition, the compact reacts producing a locally high concentration of $TiB_2$ which is uniformily dispersed throughout the holding furnace by mechanical, thermal, and or radio frequency mixing. The alloy is immediately atomized to yield rapidly rapid solidification powders.

EXAMPLE 15

A mixture of 37.2% Zr, 22.8% Si and 40% Co (by weight) is compacted and heated in a furnace. An exothermic reaction is initiated at approximately 930° C. and results in the formation of $ZrSi_2$ in a matrix of cobalt.

EXAMPLE 16

A mixture of 22.4% $B_4C$ and 57.8% Ti and 20% Cu by weight is mixed and reacted in accordance with the teachings herein. The recovered product contains a fine distribution of $TiB_2$ and TiC in a copper matrix. Boron oxide, or boron nitride may be substituted for boron carbide to yield $TiB_2$ and $TiO_2$, and $TiB_2$ and TiN, respectively.

Although the invention has been described in conjunction with specific embodiments, it is evident that many alternatives and variations will be apparent to those skilled in the art in light of the foregoing description. RS products of this invention could be used with prior art PM techniques for forming composites or subsequently treating the new product for example, subsequent heat treatment or atomization or subsequent combination with prior art products and structures including filaments and the like. Accordingly, the invention is intended to embrace all of the alternatives and variations that fall within the spirit and scope of the appended claims.

We claim:

1. A method for the production of metalsecond phase composition materials containing a second phase, said method comprising precipitating at least one second phase material in a metal matrix by contacting reactive second phase forming constituents, in the presence of a substantially non-reactive solvent matrix metal in which the second phase forming constituents are more soluble that the second phase, at a temperature at which sufficient diffusion of said constituents into the solvent matrix metal occurs, to cause reaction of the reactive second phase forming constituents to increase the temperature to a temperature exceeding the melting temperature of the matrix metal, to precipitate the second phase in the solvent matrix metal, rapidly quenching the metal-second phase composite material at a rate in the range of approximately $10^{4°}$ C. per second to $10^{8°}$ C. per second and recovering a rapidly solidified metal-second phase composite material.

2. The method of claim 1, wherein the rapid quenching is accomplished by depositing the metal-second phase material against a rapidly moving quench surface.

3. The method of claim 1, wherein the rapid quenching is accomplished by atomizing the metal-second phase material to form droplets.

4. The method of claim 3, wherein said droplets are subjected to a coolant shower.

5. The method of claim 3, wherein said droplets are deposited in a cooling bath.

6. The method of claim 1, wherein the reaction is substantially complete.

7. The method of claim 1, wherein the reactive second phase forming constituents and the solvent metal are each provided as individual elements.

8. The method as set forth in claim 1, wherein the second phase forming constituents and the solvent metal are provided as powders.

9. The method of claim 1, wherein the second phase forming constituents and the solvent metal are provided as powders that are premixed and compacted.

10. The method of claim 1, wherein the second phase is particulate.

11. The method of claim 10, wherein the particulate second phase is titanium diboride, zirconium diboride, zirconium disilicide, titanium oxide, or titanium nitride.

12. The method of claim 11, wherein the second phase is submicron in size.

13. The method of claim 1, wherein the second phase forming constituents are each provided as an alloy of said solvent metal.

14. The method of claim 13, wherein the second phase forming constituents in the solvent matrix metal are contacted in stoichiometric proportions.

15. The method of claim 1, wherein at least one second phase forming constituent is provided as an alloy of the solvent metal, and the other second phase forming constituents are provided as individual elements.

16. The method of claim 1, wherein an additional alloying material is added to dioxidize the solvent metal matrix prior to the rapid quenching.

17. The method of claim 1, wherein additional alloying material is introduced to the solvent matrix metal prior to the rapid quenching.

18. The method of claim 17, wherein the concentration of the second phase is from about 0.1 to less than about 30 volume percent.

19. The method of claim 17, wherein the solvent metal matrix and the second phase forming constituents are added incrementally to the solvent matrix metal or alloy prior to rapid quenching.

20. The method of claim 17, wherein the solvent metal matrix with the second phase precipitated therein is added to a metal or alloy prior to rapid quenching.

21. The method of claim 1, wherein the solvent matrix metal with the second phase precipitated therein is added to a metal or alloy prior to rapid quenching.

22. The method of claim 21, wherein additional alloying material is introduced to the second phase containing material prior to rapid quenching.

23. The method of claim 1, wherein the solvent metal matrix and the second phase forming constituents are added incrementally to the solvent matrix metal or alloy prior to rapid quenching.

24. The method of claim 23, wherein additional alloying material is introduced to the second phase containing material prior to rapid quenching.

25. The method of claim 1, wherein the second phase is a ceramic.

26. The method of claim 1, wherein the second phase is an intermetallic.

27. The method of claim 1, wherein the composite contains additional particles precipitated during rapid quenching.

28. The method of claim 1, wherein the composite contains additional precipitate developed by scavenging interstitials.

29. A method for precipitation of a second phase in a metallic matrix, the method comprising steps of:
  (a) preparing a mixture of reactive second phase forming constituents and a substantially nonreactive solvent matrix metal in which the second phase forming constituents are more soluble than the second phase;
  (b) heating the mixture to a reaction initiation temperature approximating the melting point of the solvent matrix metal to initiate an exothermic reaction;
  (c) permitting the exothermic reaction to further heat the mixture consuming the second phase forming constituents, and to form a uniform distribution of second phase particles;
  (d) rapidly quenching the mixture at a rate in the range of approximately $10^4$° C. per second to $10^8$° C. per second; and
  (e) recovering a rapidly solidified product.

30. The method of claim 29, wherein at least one second phase forming constituent is a transition metal of the third to sixth groups of the Periodic Table.

31. The method of claim 29, wherein the second phase is an oxide, nitride, boride, carbide, silicide, oxynitride, sulfide or oxysulfide.

32. The method of claim 29, wherein at least one second phase forming constituent is aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin copper, silver, gold, platinum, or a rare earth element.

33. The method of claim 32, wherein said solvent metal is aluminum, nickel, titanium, copper, vanadium, chromium, manganese, cobalt, iron, silicon, molybdenum, beryllium, silver, gold, platinum, ruthenium, niobium, tantalum, hafnium, zirconium, magnesium, lead, zinc, tin, tungsten, antimony, bismuth, or an alloy of such metals.

34. The method of claim 29, wherein the second phase forming constituents and the solvent metal are provided as individual elements.

35. The method of claim 29, wherein said reaction takes place in liquid state.

36. The method of claim 35, wherein the solvent metal is aluminum, nickel, titanium, copper vanadium, chromium, manganese, cobalt, iron, silicon, molybdenum, beryllium, ruthenium, silver, gold platinum, niobium, tantalum, hafnium, zirconium, magnesium, lead, zinc, tin, tungsten, antimony, bismuth, or an alloy of such metals.

37. The method of claim 36, wherein at least one second phase forming constituent is aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, gold, platinum, or a rare earth element.

38. The method of claim 37, wherein at least one other second phase forming constituent is titanium diboride, zirconium diboride, zirconium disilicide, titanium oxide, or titanium nitride.

39. The method of claim 29, wherein the second phase forming constituents are each provided as an alloy of the solvent metal.

40. The method of claim 39, wherein said solvent metal is aluminum, nickel, titanium, copper, vanadium, chromium, manganese, cobalt, iron, silicon, molybdenum, beryllium, ruthenium, silver, gold platinum, niobium, tantalum, hafnium, zirconium, magnesium, lead, zinc, tin, tungsten, antimony, bismuth, or an alloy of such metals.

41. The method of claim 40, wherein said second phase forming constituents are selected from the group consisting of aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, gold, platinum and rare earth elements.

42. The method of claim 29, wherein at least one second phase forming constituent is provided as an individual element, and the other second phase forming constituents are provided as alloys of the solvent metal.

43. The method of claim 42, wherein said solvent metal is aluminum, nickel, titanium, copper, vanadium, chromium, manganese, cobalt, iron, silicon, molybdenum, beryllium, ruthenium, silver, gold, platinum, niobium, tantalum, hafnium, zirconium, magnesium, lead, zinc, tin, tungsten, ontimony, bismuth, or an alloy of such metals.

44. The method of claim 43, wherein said second phase forming constituents are selected from the group consisting of aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron manganese, zinc, tin, copper, silver, gold, platinum and rare earth elements.

45. The method of claim 29, wherein the second phase forming constituent is boron nitride, boron carbide, or boron oxide.

46. The method of claim 29, wherein the second phase is a ceramic.

47. The method of claim 29, wherein the second phase is an intermetallic.

48. The method of claim 29, wherein the solvent matrix metal with the second phase precipitated therein is added to a metal or alloy prior to rapid quenching.

49. The method of claim 29, wherein the solvent metal matrix and the second phase forming constituents are added to a solvent matrix metal or alloy prior to rapid quenching.

50. The method of claim 29, wherein the second phase forming constituents and the solvent metal are provided as powders.

51. The method of claim 29, wherein the second phase forming constituents and the solvent metal are provided as powders that are premixed and compacted.

52. A method for dispersion of second phase dispersoids in a metal matrix, the method comprising forming a reaction mixture of reactive second phase forming constituents in the presence of at least two metals, at least one of which acts as a solvent metal, in which second phase forming constituents are more soluble than the second phase dispersoids, raising the temperature of the reaction mixture to a temperature at which sufficient diffusion of the second phase forming constituents into the lowest melting solvent metal occurs to initiate a reaction of the constituents, whereby the exothermic heat of reaction of the constituents causes the temperature of the reaction mixture to exceed the melting point of the higher melting point metal permitting dispersion of the second phase dispersoid in an alloy thereof, rapidly quenching the mixture at a rate in the range approximately $10^{4°}$ C. per second to $10^{8°}$ C. per second and recovering a rapidly solidified product.

53. The method of claim 52, wherein said higher melting solvent metal is cobalt, chromium, nickel, niobium, tantalum, titanium, vanadium, iron, or silicon.

54. The method of claim 53, wherein said lowest melting solvent metal is aluminum, copper, tin, zinc, lead or magnesium.

55. The method of claim 52, wherein additional alloying material is introduced to the solvent matrix metal prior to the rapid quenching.

56. The method of claim 52, wherein the second phase is a ceramic.

57. The method of claim 56, wherein additional alloying material is introduced to the solvent matrix metal prior to the rapid quenching.

58. A method for dispersion of second phase dispersoids in a metal matrix, the method comprising forming a reaction mixture of reactive second phase forming constituents in the presence of at least two metals, at least one of which acts as a solvent metal, in which second phase forming constituents are more soluble than the second phase dispersoids, raising the temperature of the reaction mixture to a temperature at which sufficient diffusion of the second phase forming constituents into the lowest melting solvent metal occurs to initiate a reaction of the constituents, whereby the exothermic heat of reaction of the constituents causes the temperature of the reaction mixture to exceed the melting point of the lowest melting point metal permitting dispersion of the second phase dispersoid in a mixed metal matrix, rapidly quenching the mixture at a rate in the range approximately $10^{4°}$ C. per second to $10^{8°}$ C. per second and recovering a rapidly solidified product.

59. The method of claim 58, wherein additional alloying material is introduced to the solvent matrix metal prior to the rapid quenching.

60. The method of claim 58, wherein the second phase is a ceramic.

61. The method of claim 58, wherein the second phase is an intermetallic.

62. A method for the in-situ precipitation of at least one intermetallic material in a metallic matrix, comprising the steps of:
   (a) preparing a mixture of reactive intermetallic forming constituents and a nonreactive solvent matrix metal in which the intermetallic forming constituents are more soluble than the intermetallic material;
   (b) heating the mixture to a reaction initiation temperature approximating the melting point of the solvent matrix metal;
   (c) permitting the resultant exothermic reaction to raise the temperature of the mixture to a temperature exceeding the melting point of the matrix metal and to consume the intermetallic forming constituents;
   (d) rapidly quenching the mixture at a rate in the range approximately $10^{4°}$ C. per second to $10^{8°}$ C. per second; and
   (e) recovering a rapidly solidified product.

63. The method of claim 62, wherein at least one intermetallic forming constituent ins aluminum, magnesium, chromium, manganese, iron, cobalt, copper, zinc, titanium, silicon, nickel, vanadium, molybdenum, niobium, beryllium, tin, silver, gold, hafnium, thorium, tungsten, zirconium, yttrium scandium, lanthanum, tantalum, platinum or lithium.

64. The method of claim 63, wherein said solvent metal is aluminum, nickel, titanium, copper, vanadium, chromium, manganese, cobalt, iron, silicon, molybdenum, beryllium, ruthenium, silver, gold, platinum, niobium, tantalum, hafnium, zirconium, magnesium, lead, zinc, tin, tungsten, antimony, bismuth, or an alloy of such metals.

65. A method for the in-situ precipitation of at least one ceramic material in a metallic matrix, comprising the steps of:
   (a) preparing a mixture of reactive ceramic forming constituents and a non-reactive solvent matrix metal in which the ceramic forming constituents are more soluble than the ceramic material;
   (b) heating the mixture to a reaction initiation temperature approximating the melting point of the solvent matrix metal;
   (c) permitting the resultant exothermic reaction to raise the temperature of the mixture to a temperature exceeding the melting point of the matrix metal and to consume the ceramic forming constituents;

(d) rapidly quenching the mixture at a rate in the range approximately $10^4°$ C. per second to $10^8°$ C. per second; and (e) recovering a rapidly solidified product.

66. A method for the in-situ precipitation of dispersoid particles of an intermetallic material and a ceramic material in a metal matrix, the method comprising the steps of:

(a) preparing a mixture of reactive intermetallic and ceramic forming constituents and a substantially non-reactive solvent matrix metal in which the intermetallic forming constituents and the ceramic forming constituents are more soluble than the intermetallic or the ceramic material respectively;

(b) heating the mixture to a reaction initiation temperature approximating the melting point of the solvent matrix metal;

(c) initiating an exothermic reaction to raise the temperature of the mixture to a temperature exceeding the melting point of the matrix metal and to consume the intermetallic forming constituents and the ceramic forming constituents;

(d) rapidly quenching the mix at a rate in the range approximately $10^4°$ C. per second to $10^8°$ C. per second; and (e) recovering a rapidly solidified product.

67. The method of claim 66, wherein the intermetallic forming constitutents and the ceramic forming constituents are selected from the group consisting of aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, golf, platinum, and rare earth elements.

68. The method of claim 67, wherein said solvent metal is aluminum, nickel, titanium, copper, vanadium, chromium, manganese, cobalt, iron, silicon, molybdenum, beryllium, silver, gold, platinum, niobium, tantalum, hafnium, zirconium, magnesium, lead, zinc, tin, tungsten, antimony, bismuth, or an alloy of such metals.

* * * * *